Dec. 22, 1964 W. L. POLAND ETAL 3,162,437

DOCUMENT OUTPUT MECHANISM

Filed Oct. 11, 1961 3 Sheets-Sheet 1

INVENTORS.
WILLIAM L. POLAND
MORTON P. MATTHEW

BY Richard Franklin

ATTORNEY

DOCUMENT OUTPUT MECHANISM

Filed Oct. 11, 1961 3 Sheets-Sheet 2

INVENTORS.
WILLIAM L. POLAND
MORTON P. MATTHEW

BY

ATTORNEY

INVENTORS.
WILLIAM L. POLAND
MORTON P. MATTHEW
BY
Richard Franklin
ATTORNEY

United States Patent Office 3,162,437

Patented Dec. 22, 1964

3,162,437

DOCUMENT OUTPUT MECHANISM

William L. Poland and Morton P. Matthew, Norwalk, Conn., assignors to Sperry Rand Corporation, New York, N.Y., a corporation of Delaware Filed Oct. 11, 1961, Ser. No. 144,448
13 Claims. (Cl. 271—68)

This invention relates to improvements in sorters or like apparatus for the automatic high speed handling of documents including punched record cards. More particularly it relates to a deflector for switching documents of intermixed sizes from a main path with subsequent sequential stacking in accurate registration by means of a pneumatic drum and stacker.

It is well known in the document handling art to employ deflectors of many types. Deflectors are commonly used to direct sensed cards into selected storage pockets or stackers. Similarly, conveying drums and stackers of various types have been used on card machines and paper feed devices. However, commercial documents are printed on paper stock ranging from sturdy punched record cards to thin conventional paper checks having little stability or body rigidity. Such paper checks are flexible, easily bent or marred and, conventional deflectors are not suitable. Further, due to the high rate of speed involved during their handling procedures, checks are prone to waver, flutter, or buckle from air turbulence during transport. It is, of course, obvious that documents should, as much as possible, be protected from damage not only to preserve them for future use but also to prevent their jamming the document handling machine.

In card or document handling equipment it is often necessary, after a group of documents are "read" either mechanically, electrically, or otherwise, that they be subgrouped in hoppers or pockets, thereby assembling related cards for subsequent use. Sorters are known which can segregate and rearrange a group of cards in any alphabetical or numerical sequence or subdivision desired. The conventional sorter is limited, however, to certain sizes and thicknesses of record cards.

By virtue of this invention it is possible to sense documents of varied thicknesses, ranging from paper used for bank checks to cards as employed in record controlled machines. Further, no restrictions as to length or width of documents need be adhered to since this device, according to the principle of card conveyance herein employed, accommodates any size cards in any sequence. This is of prime importance if the processing of bank checks by a central clearing office is considered where, daily, hundreds of thousands of varied size checks from many banks must be sorted, sensed for data, counted, segregated and finally assembled for mailing.

Accordingly, it is an object of this invention to provide an improved document handling apparatus.

A further object of this invention is to provide an improved document handling apparatus capable of handling documents of intermixed sizes and/or weights.

Another object of this invention is to provide an improved document handling apparatus having means for switching documents from one path to another path without damaging the documents.

Another object of this invention is to provide a deflector capable of switching moving documents of intermixed weights and/or sizes from one path to another without damaging the document.

Another object of the invention is to provide an apparatus with deflectors having narrow, low inertia moving members for intercepting and steering documents of varied lengths and widths traveling at high speeds to corresponding and coacting air evacuated drums for disposal on stacks at greatly decelerated speeds.

Another object of the invention is to provide a deflector with a massive block shaped to progressively direct all or a substantial portion of a document into a desired path following its deflection by a narrow, dart-like projection pivotally secured to said block.

Still another object of the invention is to provide a conveyor drum with pneumatic ports to attract a document against its periphery for a determined time during rotation of the drum and means to positively strip the document from the drum at the desired place of disposition.

A further object of the invention is to provide air evacuated braking means to lower the speed of travel of documents as they are stripped from the rapidly rotating vacuum drum to be completely halted at the place of disposition.

Other and further objects and advantages will become clear when the following description is read in connection with the accompanying drawing.

Figures 1, 13:
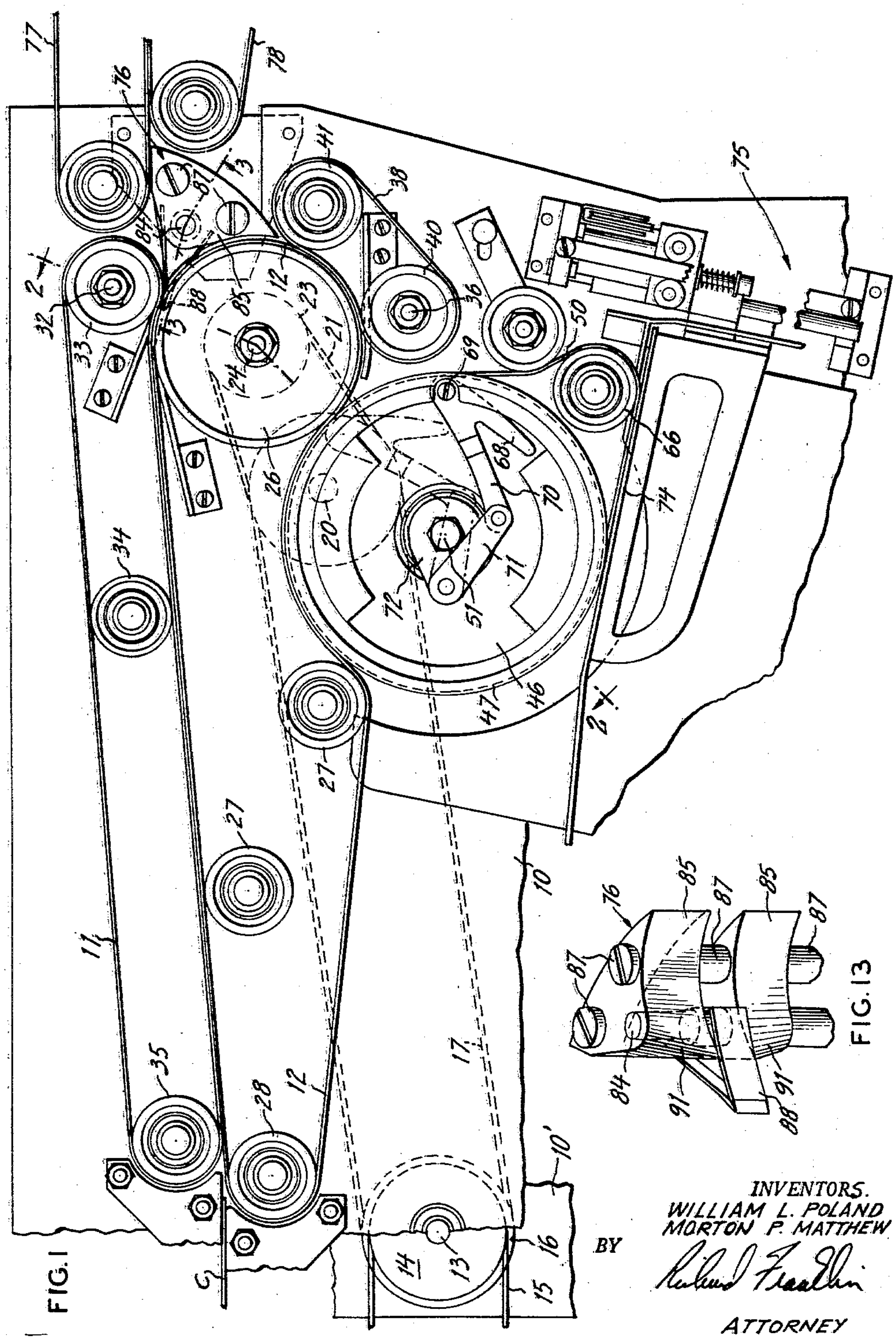
FIG. 1 is a plan view of a portion of a document sorting apparatus illustrating the relative placement of a deflector with a vacuum drum stacker.
FIG. 13 is a a view in perspective illustrating the conically tapered contours of the deflector blocks and dart.
Figures 2, 3, 4, 5, 12:
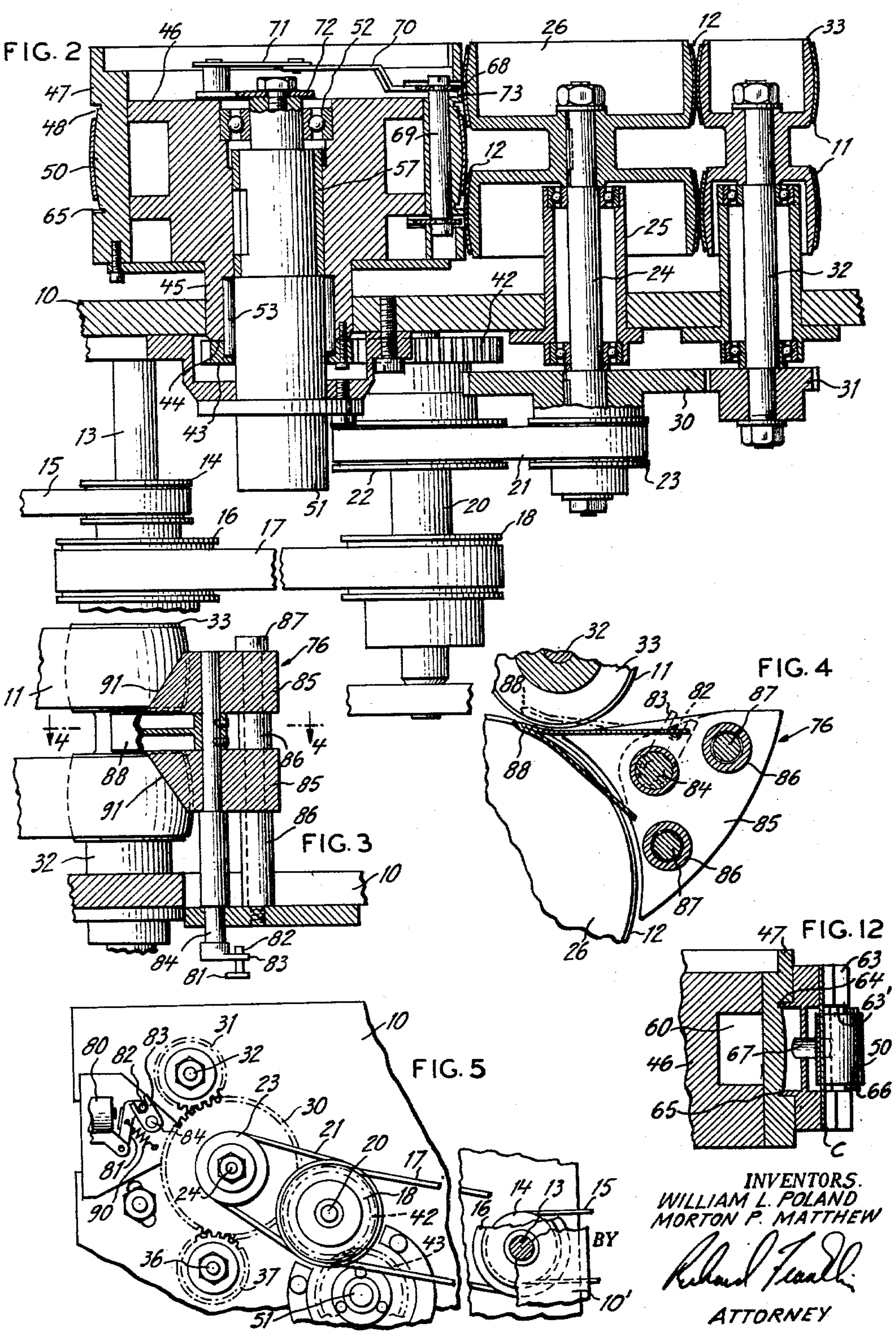
FIG. 2 is a cross section taken on line 2—2 of FIG. 1 showing the mode of drive conveyance for the drum.
FIG. 3 is a cross section taken on line 3—3 of FIG. 1 illustrating the deflector block and its movable dart-like finger.
FIG. 4 is a cross section taken on line 4—4 of FIG. 3 illustrating the deflector finger in one of its alternate positions and specifically showing it in a position to deflect cards onward in a substantially horizontal flow to another section of the apparatus.
FIG. 5 is a bottom plan of a portion of the apparatus showing the drive for the drum and the electro-magnet for actuating the deflector.
FIG. 12 is a longitudinal section taken on line 12—12 of FIG. 8 illustrating the relative proximity of the braking block to the vacuum drum periphery and the sealed air chamber thus created.

Referring now to FIG. 1, a portion of a document handling apparatus is shown in which numeral 10 designates the main table upon which all major components are mounted. A document has been conveyed in an upright position from sensing and readout stations, not shown, and is caught at its leading edge by the continuously moving belt groups 11 and 12. A main drive shaft 13, FIGS. 1 and 5, is journalled in and extends below the table 10 to terminate in a lower plate member 10'. The drive carried over pulley wheel 14 from belt 15 is transmitted through pulley 16 and belt 17 to a pulley wheel 18 of intermediary drive shaft 20, similarly journalled between tables 10 and 10'. Belt 21 thereupon transmits the drive through pulley 22 on shaft 20 to pulley 23 keyed to the lower extremity of the card belt drive shaft 24 which shaft extends above table 10 and is journalled in a bearing sleeve 25.

Shaft 24, FIG. 2, has mounted on its upper extremity a double card belt pulley 26 for driving belts 12 successively over idler card feed pulleys 27 and 28 of similar double construction, all pulleys being in one plane.

A spur gear 30 (FIG. 5) fixed to the belt drive shaft 24 between pulley 23 and table 10 meshes with and drive a smaller gear 31 in approximately 1:2 ratio. Gear 31 is keyed to the vertical pulley shaft 32 which carries a double pulley 33 to drive the belt 11 over idler pulleys 34 and 35. Shafts 24 and 32 are situated on table 10 to provide sufficient flexibility between belts 11 and 12 going over the pulleys 26 and 33 so that documents can be readily transported. Similarly, in FIG. 1, it can be seen that pulleys 27, 28, 34 and 35 are so situated that belts 11 and 12 apply sufficient hold on a card as it passes along.

Another vertical pulley shaft 36, driven by a gear 37 in mesh with gear 30, drives belts 38 over pulleys 40 and 41. Pulleys 40 and 41 are positioned with respect to the periphery of main pulley 26 so that belts 38 snugly conform accurately to a substantial segment of the belts 12 traversing pulley 26 to provide definite document conveyance. It will be noted that because of the chosen gear ratios, belts 11 and 38 travel at approximately twice the velocity of belts 12 which are driven directly from pulley 26.

In FIG. 2 it will be seen that intermediate drive shaft 20 carries, below table 10, a gear 42 meshing directly with a ring gear 43 secured to the lower face 44 of a vacuum drum core 45. Core 45 extends vertically through an aperture in table 10 and has secured to the wall of its extended upper portion 46 a peripheral ring 47 constituting the drum. The face of the drum conforms in size to the combined height of the double belt pulley 26 to which it is adjacent (FIGS. 1 and 2). A peripheral groove 48 is cut centrally of and into the face of the drum deep enough to accommodate a belt 50. Belt 50 is of lesser width than the groove for a reason to be hereinafter described.

The drum unit is caused to rotate around a stationary hollow shaft 51 over ball bearings 52 and the needle bearings 53. A bore 54 (FIGS. 6–10) extends upward into shaft 51 and terminates at a point where radial holes 55, cut into the wall of shaft 51, register with an opening 56 in an air distribution sleeve 57, pinned as at 58 to shaft 51. The drum body or upper portion 46 is hollow and forms a vacuum chamber 60 and radial ducts 60' and duct 60'', registering constantly with ports 61 in the ring 47 and the chamber 60 respectively. Sleeve member 57 maintains uninterrupted air evacuation from chamber 60 and ducts 60' and duct 60''. Duct 60'' is positioned exactly 180° opposite the lead or initial one of ducts 60' and slot 56 in sleeve 57 extends approximately 190° to include the complete open areas of ducts 60' and duct 60''.

It is obvious therefore that as the drum rotates in a counterclockwise direction (FIG. 7) duct 60' will come into register with slot 56 causing a vacuum and duct 60'' will become closed since it will turn to the solid portion of sleeve 57 thereby stopping air evacuation in a braking port 62.

Figures 6, 7, 8, 9, 10, 11:
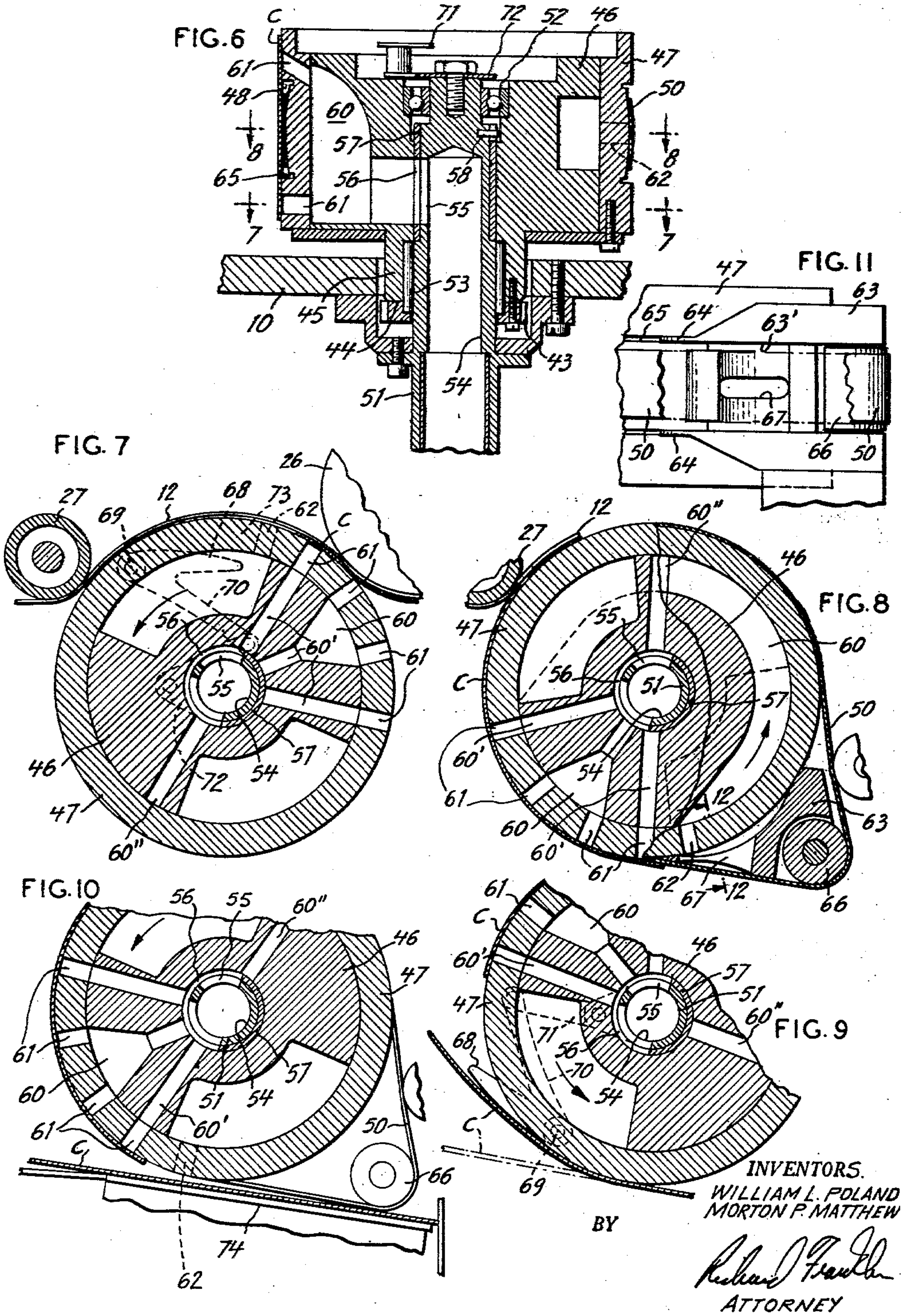
FIG. 6 is a longitudinal cross section of the drum and its hollow shaft showing more specifically the air channels and port arrangements.
FIG. 7 is a cross section taken on line 7—7 of FIG. 6 showing the air chamber and suction ports and specifically illustrating the drum ports about to be opened and the brake block port about to be closed.
FIG. 8 is a cross section taken substantially on line 8—8 of FIG. 6, the drum having been turned counterclockwise approximately 200° relatively to the stationary shaft and illustrating a card approaching the braking block.
FIG. 9 is a section similar to FIG. 7 but showing the stripper fingers freeing the trailing end of a lead card from the drum periphery.
FIG. 10 is a cross section similar to FIG. 7 illustrating the relative position taken by a stripped initial card and an oncoming second card.
FIG. 11 is a front elevation of the braking block in conjunction with the drum.

Braking port 62, positioned centrally of the drum surface and normally covered and maintained inoperative by belt 50, is always in register with vacuum chamber 60, FIGS. 8 and 12. Duct 60'' therefore acts as a connector between the sleeve 57 and chamber 60 and duct 62. Ports 61 are arranged circumferentially toward the upper and lower edges of the drum in two groups of four openings clear of the extremities of belt 50 (FIG. 6) but so placed that a document will be engaged and held by suction against the drum surface.

Referring now to FIGS. 8, 11 and 12, braking port 62 holds the leading edge of a document against belt 50 as it leaves the drum periphery and passes over a recess 63' in the surface of a braking block 63 tangential to the drum face and hollowed as at 67. Leading prongs 64 protrude from the block surface into annular grooves 65 in the drum providing positive document corner pick-up to prohibit any jamming as the card leaves the drum. An idler roller 66, centrally pivoted in a recess of the block conveys the belt 50 around the block to pass again over the drum.

A stripper finger 68, FIGS. 1, 2 and 9, mounted on stud 69 inside the drum wall for reciprocating action, has a bellcrank arm 70 connected by a spacer link 71 to a lower lever 72 which is rigidly secured to the upper extremity of shaft 54. A second stripper finger 68, of similar shape, is secured to the lower extremity of stud 69. It will be noted that with each revolution the fingers 68, by lever action, will be forced to protrude through slits 73 in the drum periphery (FIG. 9) forcing the trailing edge of a decelerated document from the drum, to provide space for the leading edge of a successive card to overtake the proceeding card or document with normal drum rotation velocity. The cards or documents, after having been retarded in their travel, come to rest against an accumulator stacker fence 74, pressure controlled by a featherlight counter-balancing mechanism 75.

Where an apparatus has a complexity of drums and stackers, to assure conveyance of documents to their proper destinations, deflectors 76 are provided (FIG. 1) to direct cards to chosen locations. If a sensed card is to be conveyed to stacker 74, an electrical impulse is supplied to solenoid 80 which is secured to the underside of table 10 in close proximity to gear wheels 30 and 31, FIG. 5. A lever, 81, actuated by the attracted core of the solenoid, carries a vertical pin 82 that extends through the bifurcated end of lever 83, turning lever 83 and its integral vertical shaft 84 clockwise.

Deflector unit 76 comprising upper and lower fixed portions or blocks 85 (FIGS. 3, 4 and 13) is secured by spacers 86 and studs 87 to the table 10. Deflector unit 76 is positioned relative to rollers 26 and 33 so that a flat nose or dartlike projection 88, protruding horizontally from a recess formed by the two portions 85, extends into an area provided by the spacing of said rollers. Nose 88 is pivotably mounted on shaft 84, said shaft being journalled in the masses 85 centrally of the studs 87 and extending toward the rollers. As shaft 84 is turned clockwise nose 88 will be moved closer to the wall of roller 33, as is shown in phantom in FIG. 4, thus opening a passage to steer or deflect an oncoming sensed card into engagement with belts 12 and 38. The deflector nose 88 is restored to normal by spring 90 which urges said nose to pivot counterclockwise upon deactivation of solenoid 80 as shown in full line in FIG. 4.

Portions 85 are conically tapered as at 91, FIG. 13, terminating with converging apexes at the lower and upper reaches of nose 88. The body portion of nose 88 is tapered to substantially conform with whatever surface of blocks 85 it is turned to. These smooth coordinating surfaces provide unimpeded passage for cards or documents to the vacuum drum thereby eliminating any damage to corners or edges which can cause serious card accumulations or pile ups.

*Operation*

The operation of this machine can best be understood if reference is made to FIGS. 1, 4, and 7–10. A document is carried by belts 11 and 12, between rollers 26 and 33, conveyed onward against the upper surface of the unmoved nose 88 of the deflector 76, then picked up by belts 77 and 78 and transported to another section of the card machine for further handling. If, however, a particular document has, through coding, caused nose 88 to be displaced as shown in phantom, FIG. 4, the document will be steered to and held against the periphery of roller 26 and will be picked up on drum 47 by the suction action of lead port 61, FIG. 7. As the drum rotates counterclockwise the document will be further adhered to its surface by the engagement of the card with the successive ports 61. Additional drive is applied to the card by the belt 12 snugly traversing a segment of the periphery of drum 47 between rollers 26 and 27, FIGS. 1 and 7, the card being urged onward between the two adjacent surfaces.

The drum rotates further, FIG. 8, until the lead port 61 approaches within approximately 5° of the vertical center of the drum at which point the solid wall portion of sleeve 57 will comemnce to cut off air suction from lead duct 60'.

The lead edge of document C being freed from suction will slide against the tangentially surfaced braking block 63 and the outer surface of belt 50 (FIG. 8).

As lead duct 60' is shut off from air suction the diametrically opposed duct 60" is opened to air suction and evacuates the air from port 62 through chamber 60, thereupon evacuating the air in the hollowed portion 67 of braking block 63. The leading edge of the card is forced by suction against the surface braking port and belt 50, prongs 64 assisting in the stripping of the document corners. Belt 50, traveling at drum velocity, prevents any dead stopping of the card which would normally lead to bouncing and result in bending and breaking. The card is virtually at rest as it approaches the stop on the stacking mechanism 74.

It will be understood that while the initial document is being decelerated, it will normally be overtaken by the second document already on the drum and traveling at drum velocity (FIG. 9). To forestall any overlapping of documents stripper fingers 68 are cammed outward beyond the periphery of the drum by the bellcrank action of levers 70, 71 and 72, to engage the trailing edge of the lead document and push it away from the drum, whereupon it will fall away from the drum by gravity as shown in phantom, FIG. 9. As the lead document decelerates in speed the leading edge of the second document gradually occupies the area on the drum periphery occupied previously by the trailing edge of the lead document. FIG. 10 shows the lead document completely disengaged from the effects of drum suction.

Thus, as the document, traveling at drum speed, reaches the tangential portion of brake block 63 the evacuation of air from chamber 67 is accomplished through duct 60" and port 62. This reduced pressure is applied to the document forcing it against belt 50, by virtue of the recess or chamber 63'.

Up to this time the vacuum applying areas, ports 61, had been rotating with the document at the same speed. Now the area of reduced pressure, i.e., 67 is stationary relative to the document motion. This causes the document to be attracted against belt 50 and appreciably slow it.

An uninterrupted flow of documents can, in this manner, be maintained and documents can be stacked against the fence of the stacker 74, having travelled initially at a rate of approximately 700 cards per minute yet terminating at the stacker virtually motionless.

It can be seen that the documents are, in this manner, unharmed, leaving them available for further processing, or use where only perfect documents can be utilized. Further, the apparatus described imposes no limitation on the documents such as uniformity of size and/or weight.

Although the invention has been disclosed and illustrated with reference to particular applications, the principles involved are susceptible of numerous other applications as will be apparent to persons skilled in the art. The invention is, therefore, intended to be limited only as indicated by the scope of the appended claims. For example, it will be appreciated that the terms "card" and "document" as used in the specification and in the claims are intended to cover any types of discrete support units which are capable of storing information.

What is claimed:

1. In a document handling apparatus including a table and power means mounted on said table, the combination of document conveying means driven by said power means, rotary document carrying drum means at the terminus of and adjacent said conveying means, said drum means including a plurality of peripheral ports communicating with a source of reduced pressure, means movably mounted on the table for selectively deflecting documents from said conveying means to said document carrying means, means for disengaging documents from said carrying means, means for decelerating documents including a break member mounted juxtaposed said drum means and along the document path, said brake member further including an aperture formed therethrough for communicating with one of said peripheral ports during a portion of the time said port experiences reduced pressure, a channel formed in said brake member so positioned to transmit the pressure at said aperture to the edges of said document conveying means, and means adjacent said carrying means for successively stacking the documents.

2. The apparatus defined in claim 1 wherein said disengaging means comprises a shaft mounted within said drum, an axial stud rotatably mounted within said drum, a plurality of stripper slits formed in said drum, a plurality of stripper fingers mounted on said stud and formed to swing within the limitations of said slits, and articulate lever means connecting said fingers with said shaft for causing said stripper fingers to project through said slits forcing the trailing end of a document from the drum periphery, during a predetermined portion of each drum cycle after passage of the document past the deflecting means.

3. A document handler comprising, a rotatably mounted hollow drum having at least two apertures formed in its circumference displaced from one another in the direction of drum rotation, means for decreasing air pressure within said drum, a control for permitting the appearance of reduced pressure at each of said apertures separately for approximately 180° of drum rotation, and a brake member having an operating surface substantially tangent to the drum circumference, said control regulating said apertures so that one begins to exhibit reduced pressure as it reaches the point of tangency of said brake with said drum.

4. The device of claim 3, and further including at least one arm associated with said drum, said arm being located relative to the surface of said drum so that a document thereon will be unaffected by said arm, and control means for said arm, said control means changing the position of said arm at a predetermined time.

5. The device of claim 3, and further including at least one stripper arm associated with said drum, said arm being located relative to the surface of said drum so that a document thereon is unaffected by said arm, control means for moving said arm into position to displace said document from said surface during at least a portion of the time said one duct exhibits reduced pressure.

6. A document handling apparatus comprising, in combination, a drum rotatably mounted on a hallow shaft, at least two ducts formed within said drum extending from the circumference of said shaft through the diameter of said drum, vacuum producing means connected to said shaft, one of said ducts being substantially 180° distant in the direction of drum rotation from any other duct, an idler roller, a belt about said drum and said idler roller and driven by said drum, said belt being narrower than and being located centrally of the periphery of said drum, said one duct being located in said drum periphery and capable of being closed by said belt except when near said idler roller, said other ducts being located so as to be unaffected by said belt, control means associated with said shaft and said drum, causing a reduced pressure to appear at each of said ducts for approximately one half cycle of drum rotation and a brake member mounted between said drum and said idler roller and between said belt and said drum, said brake member having an aperture formed therethrough to communicate with said one of said ducts during a portion of the time said duct exhibits reduced pressure, and a channel formed in said brake member located to transmit the pressure at said aperture to the edges of said belt.

7. Apparatus for handling easily mutilated documents comprising at least a high speed document feeding belt, at least first and second possible destinations for a document transported by said belt, movable selecting means associated with said belt for selectively diverting a document from said first destination to said second destination, and decelerating means between said belt and said second destination for decreasing the velocity of said document, said decelerating means including a high speed evacuated drum to retain a document on its surface for a portion of a drum cycle, a block tangential to said drum providing a document path, means for causing a vacuum in said block when a document is on said document path, and a port formed in said block for applying said vacuum to a document passing thereover.

8. A document decelerator comprising a hollow drum rotating at document speed, vacuum means for causing reduced pressure within said drum, a plurality of ducts formed within said drum and communicating between the surface of said drum and said area of reduced pressure, said ducts rotating with said drum and holding a document to the surface thereof, a path forming a brake member tangential to said drum, said brake member having an aperture formed therethrough to communicate with one of said ducts during a portion of the time said duct exhibits reduced pressure, a channel formed in said brake member and positioned to transmit the pressure at said aperture to a document, and means for causing a reduced pressure to appear at a fixed portion of said path, said last named means causing said reduced pressure to be cut off from each of said ducts for approximately one half of a drum cycle.

9. The device defined in claim 8, wherein said path includes an idler roller, a brake block between said idler roller and said drum and tangential to said drum, and a belt about said idler roller, brake block and drum.

10. The device defined in claim 9, wherein said last named means includes a duct 180° removed in the direction of drum rotation from every other duct, said removed duct communicating with said area of reduced pressure for approximately 180° of a drum cycle, and port means formed through said brake block and registering with said removed duct for a portion of said 180° of drum cycle.

11. The machine defined in claim 10, wherein said deceleration further includes at least a stripper arm which forces the trailing edge of a document away from the surface of said drum after the leading edge thereof has entered said tangential path.

12. A document decelerator comprising a shaft, having a central bore, a drum rotatably mounted on said shaft, a braking duct and at least one other duct formed in said drum and extending from said shaft through the surface of said drum, said braking duct being located 180° in the direction of drum rotation from any other duct, a sleeve integral with and surrounding the central bore of said shaft, said sleeve having a cutout portion communicating with each of said ducts for approximately one half cycle of drum rotation, vacuum producing means connected to the central bore of said shaft, an idler roller, a brake member located between said idler roller and said drum and having a surface tangential to the drum, a belt about said drum, said brake member and said idler roller having a width less than that of the drum, said braking duct being covered by said belt during a portion of drum rotation, said other ducts being located on the drum surface to be free of said belt, said brake member being shaped to define a chamber between itself and the drum surface, a port formed in the tangential surface of said member and communicating with said port, and means formed in said brake member permitting reduced pressure present at said port to appear at at least one side of said belt.

13. In a document handling apparatus having a table, the combination of a series of document conveyor means in aligned relationship, a plurality of document transfer roller means arranged in converging relationship with said conveyor means, power means for driving said series of conveyor means and transfer roller means, a document deflector mounted on said table substantially at the junctures of said conveyor means and transfer roller means, a dart portion movably mounted in said deflector, said deflector including a stationary portion having walls conforming in conical contour with and straddling said dart portion for preventing edge mutilation of documents directed to said transfer roller means, and signal controlled means for moving said dart in the path of and for deflecting an oncoming document into engagement with one of the said transfer roller means.

References Cited in the file of this patent

UNITED STATES PATENTS

| | | |
|---|---|---|
| 1,223,517 | Peters et al. | Apr. 24, 1917 |
| 1,838,200 | Tomtlund | Dec. 29, 1931 |
| 1,950,880 | Duncan | Mar. 13, 1934 |
| 2,294,649 | Baker | Sept. 1, 1942 |
| 2,526,916 | Turrall | Oct. 24, 1946 |
| 3,009,697 | Halden | Nov. 21, 1961 |
| 3,083,012 | Poland | Mar. 26, 1963 |